April 26, 1932.　　J. G. VINCENT　　1,855,500
HYDROCARBON MOTOR
Filed July 11, 1921　　2 Sheets-Sheet 2

SCALE IN POUNDS

INVENTOR:
Jesse G. Vincent,
BY
Miller Tibbetts
ATTORNEY.

Patented Apr. 26, 1932

1,855,500

UNITED STATES PATENT OFFICE

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN

HYDROCARBON MOTOR

Application filed July 11, 1921. Serial No. 483,719.

This invention relates to hydrocarbon motors and particularly to the lubrication thereof.

In hydrocarbon motors probably the most difficult, as well as the most necessary, parts to lubricate are the cylinder wall and the crank shaft bearings, the latter including also the connecting rod bearing on the crank pin. Usually the crank shaft bearings are lubricated by oil under pressure and the cylinder wall is most generally lubricated by the oil thrown from the ends of the connecting rod journal or from oil splashed from the bottom of the crank case. The piston or its rings are depended upon to scrape the excess oil off of the cylinder wall in order that too much oil may not pass the piston into the combustion space of the motor.

Too much oil on the crank shaft bearings is not objectionable but too much oil fed to the cylinder wall is sometimes a serious detriment particularly if the piston or rings, or both, are worn. Oil under high pressure, therefore, is usually depended upon to lubricate the crank shaft bearings and the passage from the conduit in the crank shaft to the bearing surfaces of the crank shaft is usually directed, either radially outward from the axis of the crank shaft or in some instances to that part of the bearing which receives the greatest load.

With such means as above described for feeding oil to the crank shaft bearings, or where splash is depended upon for getting oil to the cylinder walls, it is evident that the amount of oil supplied to the cylinder walls will depend very largely upon either the fit of the crank shaft bearings or the amount of oil in the crank case and the consequence is that over-lubrication of the cylinder wall results from a worn motor or from an over-full crank case.

One of the objects of the present invention is to provide uniform lubrication for the cylinder wall practically regardless of the fit of the connecting rod or crank shaft bearings.

Another object of the invention is to provide means for deflecting the greater part or all of the oil thrown from the crank shaft bearings away from the cylinder wall and then supply a given quantity of oil to the cylinder wall for its lubrication.

Another object of the invention is to provide lubrication means for the crank shaft bearings so that the oil may be fed to the region which is not loaded, or is loaded to a minimum, through the cycle of operation of the motor.

Another object of the invention is to provide an oil feed passage to that part of the crank pin bearing which carries the minimum load.

Other objects of the invention will appear from the following description taken in connection with the drawings which form a part of this specification and in which Fig. 1 is a vertical longitudinal sectional view through the forward part of hydrocarbon motor embodying this invention;

Figure 1:
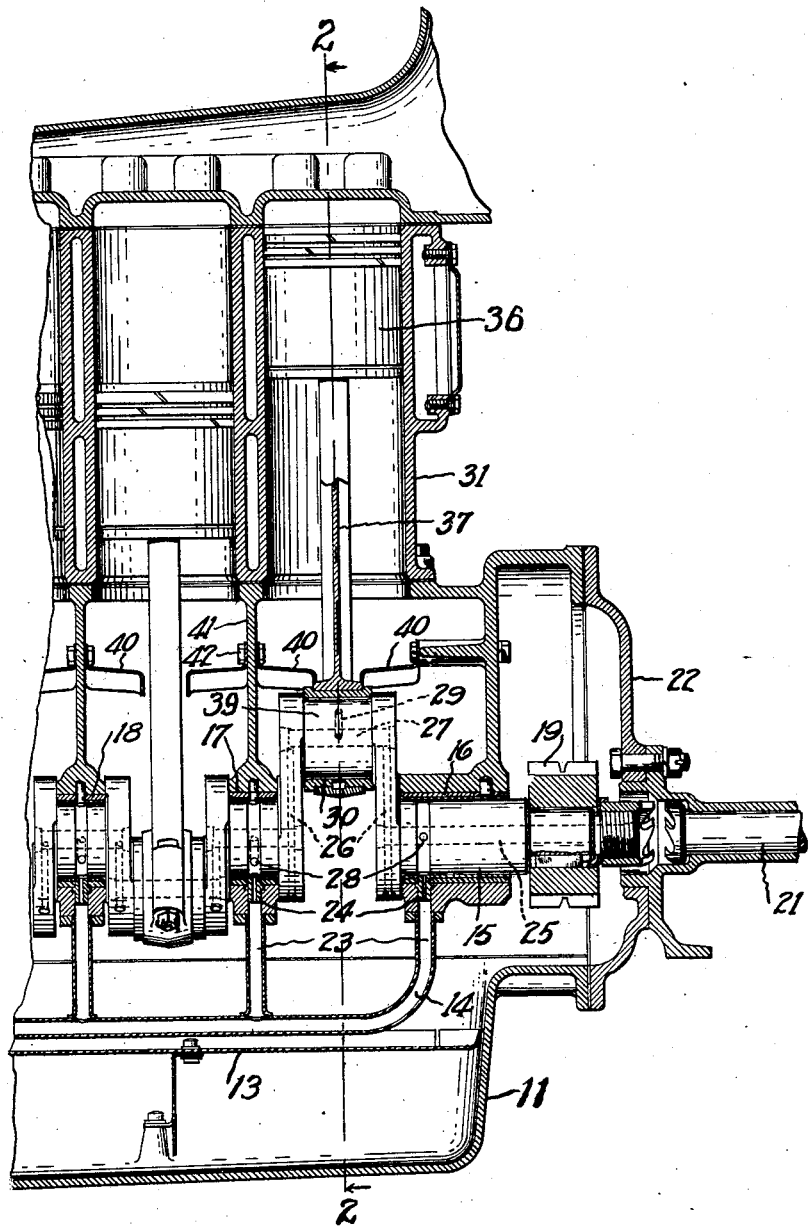

Referring to the drawings, 10 represents the crank case or support of a hydrocarbon motor. The lower part 11 of the crank case forms an oil well and an oil pump 12 is located in this well, preferably below the screen 13, through which the oil drains. The pump 12 is adapted to be operated by any suitable moving part of the motor and is connected to a supply pipe 14 which thereby supplies oil under pressure to the various parts of the motor to be lubricated.

A crank shaft 15 is supported in the crank case in a series of main bearings 16, 17 and 18. On the front end of the crank shaft, as shown in Fig. 1, is a gear or sprocket 19 by which the cam shaft 20, Fig. 2, may be driven, and in line with the crank shaft is a starting shaft 21. The front end of the crank case is accessible by detaching the removable cover 22.

Figure 2:
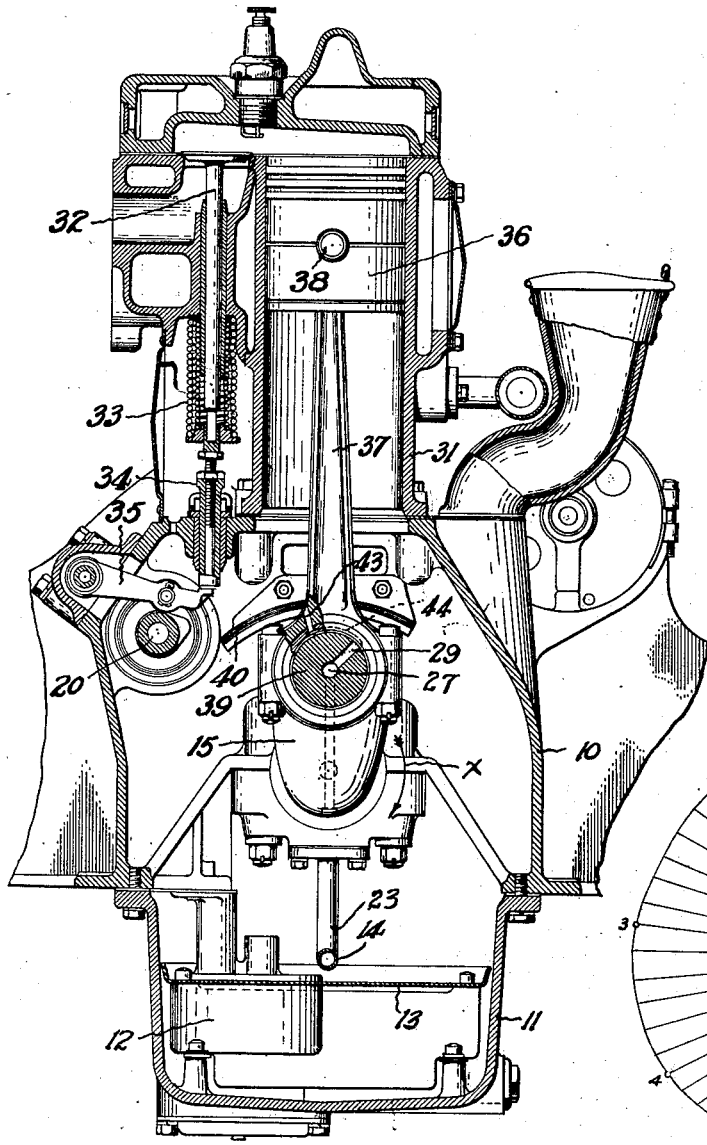
Fig. 2 is a transverse vertical section through the motor shown in Fig. 1, substantially on the line 2—2 of Fig. 1.

The oil supply pipe 14 is connected by branches 23 with the bearings 16, 17 and 18, as shown particularly in Figs. 1 and 2, and passages 24 in the bearings carry the oil to the contact surfaces of the bearings. The crank shaft 15 is drilled as shown at 25, 26 and 27 and with radial passages 28 so that the oil is carried under pressure to the interior of the crank shaft and from there it is led through other radial passages 29 to the crank pin bearings 30, which latter passages will be hereinafter particularly referred to.

Mounted upon the crank case 10 is a cylinder block 31. The motor illustrated is a six-cylinder motor, the two or three forward cylinders only being shown, but it will be understood that the invention is applicable to any number of cylinders. One of the motor valves is shown at 32 and the valve operating mechanism includes the springs 33, a push rod 34 and a rocker arm 35 which is operated by the cam shaft 20 above referred to.

Mounted in the cylinder 31 is a piston 36, and a connecting rod 37 has its small end pivoted to the piston as at 38 and its large end journalled on the crank pin 39 of the crank shaft. The bearing 30 above referred to surrounds the crank pin 39 and is supplied with lubricant under pressure through the radial passage 29 above described.

Of course the oil fed to the bearing 30 will leak out at the ends of the bearing and the centrifugal force of the crank shaft in operation would throw some of this oil into the cylinder 31 and against the wall thereof were it not for baffle plates 40, shown in Figures 1 and 2. These baffles are secured to suitable parts 41 of the crank case, as by bolts 42, and they extend in an arc above the path of travel of the crank pin 39 so that they catch and deflect the oil issuing from the ends of the bearing 30. There is just room enough with good clearance between these baffles for the connecting rod 37 to operate.

In order that the cylinder may be supplied with the correct amount of oil and not be dependent upon the fit of the connecting rod bearings, means are formed in the connecting rod for supplying oil directly from the bearing 30 to the cylinder wall. This means comprises a diagonally extending opening 43 as shown in Fig. 2, and a groove 44 extends partly around the bearing and registers with the passage 29 when the crank pin is in its highest position. Thus the opening or port 43 will be supplied with oil under pressure and will throw or project the oil into the cylinder 31 and against the wall thereof, and the quantity of oil thus supplied to the cylinder wall will depend on the size of the opening 43, the length of the groove 44, and the pressure of the oil. The size of the port 43 and the length of the groove 44 will, of course, remain constant and not vary with the worn condition of the motor.

Figure 3:
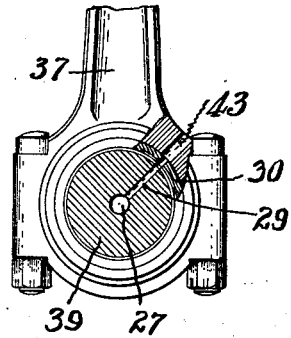
Fig. 3 is an enlarged detail view of the connecting rod and crank pin bearing.

In some motors it may be found that if the port 43 is arranged as shown in Fig. 2 of the drawings, too much oil may be supplied to the valve operating mechanism and leakage of oil around the detachable covers thereof may result. In such case, the port 43 may be arranged as shown in Fig. 3, that is on the other side of the connecting rod. In the first instance the oil will be projected directly against that side of the cylinder wall which receives the greatest thrust on the working stroke, but in the construction shown in Fig. 3 the oil will be thrown out centrifugally so that while the greater part of it is probably projected against the right-hand side of the cylinder wall, yet sufficient oil is also supplied to the other side and plenty of lubrication results without at the same time over-lubricating the valve mechanism.

Returning to the arrangement of the radial passage 29 in the crank pin, it will be noted that this passage is arranged substantially at 45° leading from the vertical, that is with the motor turning in the direction indicated by the arrow $x$. In this position the oil is fed to the connecting rod bearing on the crank pin in the region which is not loaded during any part of the cycle of operation of the motor, which region changes under certain load and speed conditions and consequently the oil is better able to get into the bearing.

The theory of this arrangement of the radial passage 29, being opposed to prior practice, will be briefly described and in doing so, consideration will first be given to the action of a plain bearing. When a shaft carrying loads in one direction only is mounted in a plain bearing and is at rest, the theoretical point of contact between the bearing and the shaft or journal lies on the line of the center of gravity of the load. As the shaft rotates, this point of contact moves out from the line of resultant load to a new position. Due to adhesion between the lubricant and the bearing surfaces, an oil wedge is formed which tends to travel in the direction of the shaft rotation and to force itself between the bearing and shaft at the point of contact. The film of oil builds up at this point, the bearing surfaces becoming separated, and this becomes the area of greatest pressure in the bearing. If the oil feed passage terminated at this point and insufficient pressure were supplied, that is any pressure less than that existing in this region, oil would flow out of rather than into the bearing and consequently metallic contact would occur. Very high pressure therefore would be necessary to successfully feed oil under these conditions.

However, by very exhaustive experiments it has been found that in certain other regions of the bearing very low pressures exist, in fact suction frequently exists at the point of minimum pressure and lubricant even at atmospheric pressure when introduced at this point will flow readily into the bearing.

The connecting rod bearing which we are considering, however, differs slightly in its movement from the plain bearing above described, and the character of the forces acting upon it are such that the magnitude and direction of load are constantly changing with respect to the bearing. Such a bearing is subjected to the action of three important forces; these being the gas pressure on the piston as transmitted through the connecting rod, the inertia forces which arise from the changing velocity of the reciprocating parts, and the centrifugal forces due to the rotation of the large end of the connecting rod. The load on the bearing is the combined pressure or resultant of these forces and it varies considerably under certain conditions of engine load and speed. Thus if the engine is developing its maximum power at a low speed, the gas pressure is probably the predominating force and will most largely affect the direction and amount of the resultant load. If the engine power is lowered, or held constant and the speed increased, then the centrifugal and inertia forces both increase and become the controlling factors, modifying the resultant load which changes accordingly in direction or amount, or both. Consequently the point of contact or the region of highest pressure does not remain fixed on the bearing surface but is constantly changing. Theoretically, to maintain the same conditions as for an ordinary plain bearing the terminal of the oil hole would have to move with the movement of the region of high pressure but from a practical standpoint this is not necessary and the oil may be introduced under reasonable pressure at a given point in the low pressure area and it will flow readily to the bearing and quickly and adequately establish the necessary oil film.

Figure 4:
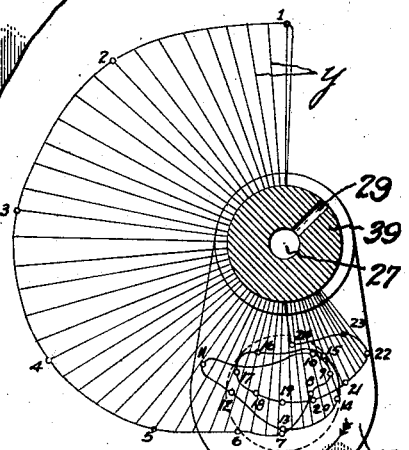
Fig. 4 is a diagram showing the distribution of pressure on the crank pin of the motor shown in Figs. 1 and 2, through the cycle of operation of the motor under typical load and speed conditions.

Exhaustive tests to determine the pressure distribution on the crank pin of a motor such as that shown in this application have been made and the diagram shown in Fig. 4 substantially illustrates this distribution of pressure. The crank pin is illustrated at 39 and the oil hole at 29. The central oil passage is indicated at 27.

The diagram represents the load distribution on the crank-pin during a complete cycle of the engine or two revolutions of the crank-shaft, and is constructed by determining the resultant loads relative to the crank-pin axis for each 30° of crank travel during the complete cycle of 720°. Vectors representing these loads are laid off from an origin representing the crank-pin axis, giving the respective points numbered 1 to 24 on the diagram; thus the lines $y$ connecting these points indicate both the direction and the magnitude of the load pressures which they represent. Points 1 to 6 represent the explosion or power stroke in which the gas pressure on the pistons is the predominating factor, points 6 to 12 represent the exhaust and points 12 to 18 the intake strokes respectively, while points 18 to 24 represent the compression stroke, in which piston pressure is again of a considerable magnitude. A curve through these points is the locus of combined or resultant pressure through the engine cycle, and it will be evident from this curve that the pressure is distributed over a portion of the area of the bearing surface, leaving a portion of the area which is unloaded, or only slightly loaded, at all times. This area is referred to as the minimum pressure area of the bearing.

The general disposition of this area on diagrams such as Fig. 4 varies considerably with engine speed and load, as previously explained, and the area of maximum pressure gradually moves away from the upper side in a counter clock-wise direction around the crank-pin as the engine speed is increased. There is, however, always an area of minimum pressure, and this area is always somewhat in advance of the connecting rod axis in a leading direction with respect to crank rotation, as indicated by the arrow $x$, or at the right of Fig. 4. Then by arranging the passage or opening 29 at substantially 45° from the vertical in a leading direction, it will always communicate with the minimum pressure area. This permits oil to be readily introduced to the bearing at comparatively low pressure and it will be readily carried to the area of high pressure and distributed thereto in the form of a thin wedge in the manner described.

Other forms of the device may be made without departing from the spirit or scope of the invention and it will be understood that the form shown in the drawings is illustrative only.

Having thus described my invention, what I claim and desire to secure by Letters Patent is:

1. In a hydrocarbon motor, the combination with the crank case, the crank shaft therein, the cylinder, and the connecting rod journalled on the crank pin, said crank pin having an oil passage extending to that part of the journal surface which is not loaded throughout the cycle of operation of the motor, of means for directing oil from the bearing to the cylinder wall.

2. In a hydrocarbon motor, the combination with the crank case, the crank shaft therein, the cylinder and the connecting rod journalled on the crank pin, said crank pin having an oil passage extending to that part of the journal surface which is not loaded throughout the cycle of operation of the motor, of means in the connecting rod for leading oil from said journal during part of the revolution of the crank shaft to a point where it can be directed against the cylinder wall.

In testimony whereof I affix my signature.

JESSE G. VINCENT.